United States Patent Office 3,337,763
Patented Aug. 22, 1967

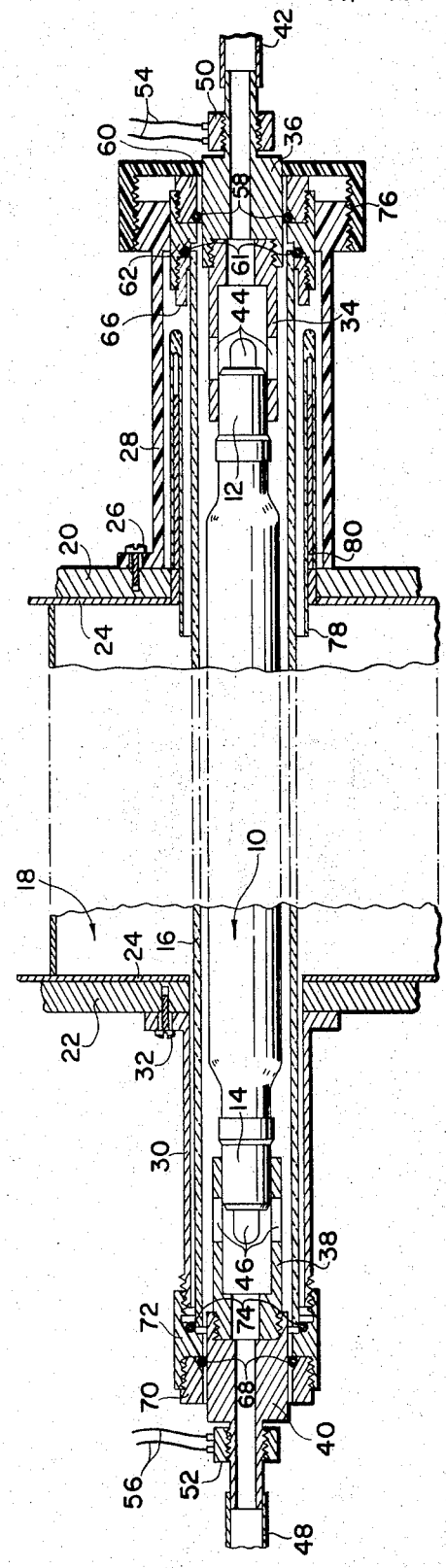

3,337,763
FLASH LAMP MOUNTING APPARATUS
Arnold J. Aronson, Brookline, Zane A. Green, Watertown, and William E. Hurley, Holliston, Mass., assignors to Maser Optics, Inc., Boston, Mass., a corporation of Delaware
Filed Mar. 30, 1964, Ser. No. 355,567
1 Claim. (Cl. 313—22)

The present invention relates to flash lamp mounting systems, and more specifically to thermal and electrical insulating mounting arrangements for gaseous discharge flash lamps and the like. Still more specifically, the invention relates to novel and advantageous mounting arrangements for flash lamps which are employed in laser heads and the like.

The most common method of producing a laser beam is to emit a short, high intensity light flash which is absorbed in a particular wavelength range by an active medium, resulting in a change in the energy state of the atoms of the medium, or laser rod, which brings about emission of a substantially monochromatic light beam. In general, the most satisfactory means of providing the excitation for the laser rod is a gaseous discharge tube such as a xenon flash lamp having a spectral output from the ultraviolet into the infrared region. Both the flash lamp and laser rod may be conveniently mounted within a cavity or enclosure, preferably having a highly reflective internal surface to achieve maximum efficiency from the output of the lamp.

The flash from the xenon tube is produced by discharging a relatively large amount of electrical energy, as from a bank of capacitors, through the tube. A relatively large amount of heat is normally produced by the light flash from the tube as well as by the laser beam itself. Since both a high energy electrical discharge and a high heat rate are associated with the emission of the flash for exciting the laser rod it is desirable to provide both electrical and thermal insulating means to insure proper and efficient operation of the lamp.

Accordingly, it is a principal object of the present invention to provide novel means for operatively mounting a flash lamp within the cavity of a laser head, which means provide proper electrical and thermal insulation of the lamp to insure its efficient operation.

A further object of the invention is to provide a unitary arrangement for utilizing a flash lamp as part of a laser head and including necessary electrical connections and insulation in combination with means for dissipating at least a portion of the heat associated with operation of the lamp.

Another object is to provide means for mounting within the cavity of a laser head, or the like, a flash lamp having nylon insulating and mounting elements and including means for preventing outgassing of the nylon, due to exposure to the high intensity light, into the interior of the cavity and thus causing discoloration of the reflective inner surface of the cavity.

A still further object is to provide a fluid cooling system, including inlet and outlet means, in combination with an electrical mounting and insulating device for a flash lamp employed as part of a laser head.

Still another object is to provide novel and efficient apparatus for operatively mounting a flash lamp within the cavity of a laser head, whereby a relatively large amount of electrical energy may be discharged through the lamp without danger of arcing between the anode of the lamp and the wall of the laser head.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claim.

For a fuller understanding of the nature and objects of the invention, references should be had to the following detailed description taken in connection with the accompanying drawing wherein the single figure is a side elevational view, in vertical section through the center, of a flash lamp mounted according to the present invention within the cavity of a laser head, a fragment of which is shown in the drawing.

Referring now to the drawing, the reference numeral 10 denotes generally a flash lamp assembly of the gaseous discharge type, having anode and cathode ends, 12 and 14 respectively. For purposes of discussion lamp 10 will be considered a conventional xenon lamp, although it will be readily understood that the invention is not limited solely to employment with such lamps. Lamp 10 is surrounded by cooling jacket 16 and supported concentrically within the jacket by means described hereinafter. Both the enclosing tube of lamp 10 and cooling jacket 16 are preferably constructed of a transparent material such as quartz.

The major central portions of lamp 10 and jacket 16 are mounted within a cavity tube, denoted generally by reference numeral 18, of a laser head. Cavity tube 18 is enclosed on the ends, through which the lamp and jacket extend, by end plates 20 and 22, and lined with reflector plate 24. The internal shape of cavity tube 18, which also encloses the active medium (not shown) which is excited by lamp 10, is commonly elliptical and the internal surface is highly reflective of the light emitted by the lamp.

Connected to end plate 20 by means of one or more screws 26, at the anode end of lamp 10, is lamp retainer 28 which is made of an inexpensive and easily moldable electrical insulating material such as nylon. Lamp retainer 30 is similarly affixed by screws 32 to end plate 22 at the cathode end of lamp 10. Anode 12 is slidingly inserted into, and preferably soldered to, inner connector 34 which is threadedly joined to outer connector 36. Cathode 14 is likewise soldered to inner connector 38 which is joined to outer connector 40. The connectors are constructed in two sections so that the inner connectors may be matched to the size of the particular lamp base used and interchanged with standard outer connectors.

An appropriate coolant is supplied through inlet tube 42 and flows through connectors 34 and 36 to the anode end of lamp 10. Openings 44 are provided in inner connector 34 to allow the coolant to flow out of the connector and into cooling jacket 16. The coolant then flows through the cooling jacket, surrounding lamp 10, through openings 46 into connectors 38 and 40 and is discharged through outlet tube 48. The coolant is adapted to absorb a significant amount of the heat associated with the high intensity light flash from xenon lamp 10. The coolant may be passed through the system only once and discharged or, if desired, the heat may be removed from the coolant by any appropriate means, allowing it to be continuously recirculated through the system.

Inner connectors 34 and 38 and outer connectors 36 and 40 are constructed of electrically conducting material such as brass. Terminal nuts 50 and 52 are threaded onto outer connectors 36 and 40, respectively. Anode 12 is connected, through connectors 34 and 36, terminal nut 50 and electrical leads 54 to a source of high electrical potential, such as a bank of capacitors, for example. Cathode 14 is connected, through connectors 38 and 40, terminal nut 52 and electrical leads 56, to ground. Thus, connectors 34, 36, 38 and 40 serve both as electrical connections for the lamp and as means for introducing the coolant into, and discharging it from, the system.

The system is sealed between outer connector 36 and cooling jacket 16 by means of O-ring 58 which is retained between cooling jacket nut 60 and body 62. O-ring 64 is retained between body 62 and nut 66 to complete the sealing at the anode end of the lamp. The cathode end is sealed by means of O-ring 68, retained between nut 70 and body 72, and O-ring 74, retained between body 72 and lamp retainer 30 to which body 72 is directly threaded. Cooling jacket 16 and connector 36 are thus supported by nuts 66 and 60, respectively, which are bridged by body portion 62. The outside diameter of body 62 is dimensioned to be slidingly inserted in the end of lamp retainer 28 which is fixedly secured to end plate 20. At the cathode end, connector 40 is supported by nut 70 and cooling jacket 16 by lamp retainer 30, nut 70 and retainer 30 being bridged by body portion 72 so that O-rings 68 and 74 may be properly retained to assist in providing a resilient support and to seal the system.

Retainer nut 76 is provided at the anode end of the system, threaded to lamp retainer 28 and extending over the end of nut 60. Preferably, retainer nut 76 is constructed of the same material as retainer 28, such as nylon. Retainer nut 76 is provided as shown to prevent nuts 60 and 66, body portion 62 and other parts from flying out of the anode end of the system in the event of breakage of the lamp or other malfunction. Since body portion 72 is threaded directly to lamp retainer 30, which in turn is connected to the laser head, no retainer nut is required at the cathode end of the system.

Also provided at the anode end are double-walled insulator 78 and bushing 80. Bushing 80 is slidingly inserted in an opening in end plate 20 and extends outwardly therefrom, encircling the anode end of flash lamp 10. Insulator 78 is supported upon bushing 80 which extends between the walls of the insulator. The inner wall of insulator 78 extends a short distance into cavity 18, through the opening in end plate 22, and doubles back on the opposite side of bushing 80 to form the outer wall which terminates adjacent end plate 20.

Since all of the apparatus at the cathode end of the lamp is at ground potential, lamp retainer 30, as well as the other elements, may be made of metal. However, lamp retainer 28 must be made of an electrically insulating material since a high voltage is applied to the anode end of the lamp. As previously mentioned, nylon or other such plastics would be suitable materials from which to construct lamp retainer 28. Such substances may be "burned," however, from repeated exposure to the high intensity light flash, and will outgas into the cavity and discolor the reflective inner surface thereof. Bushing 80 is therefore provided to shield lamp retainer 28 from the rays emitted by lamp 10. Since bushing 80 must both be opaque to light from the lamp and not be "burned" thereby, it is preferably constructed of metal. Cooling jacket nuts 60 and 66, as well as body portion 62, also receive the light rays from lamp 10 and are, therefore, also constructed of metal. Glass insulator 78 is thus provided, surrounding bushing 80, to prevent arcing between cooling jacket nut 66 and bushing 80. The double-walled construction of insulator 78, with one wall extending inside cavity 18, increases the length of the arc path between nut 66 and the nearest conducting material which is at ground potential. A box-like enclosure (not shown) is provided as a further safety feature and is positioned to enclose all the apparatus at the anode end before the device may be operated.

Thus, a unitary and compact structure is provided for mounting the flash lamp within the laser cavity with proper electrical connections. Means are provided for electrically and thermally insulating the lamp as well as for protecting against undesirable arcing and outgassing of the nylon insulating elements.

Since certain changes may be made in the above apparatus without departing from the scope of the invention herein involved, it is intended that all matter contained in the above description or shown in the accompanying drawing shall be interpreted as illustrative and not in a limiting sense.

What is claimed is:

Apparatus for mounting an elongated, cylindrical flash lamp with respect to a laser head, wherein the major central portion of said lamp is within the cavity of said laser head and the anode and cathode ends of said lamp extend outside said cavity, said apparatus comprising, in combination:

(a) a transparent, cylindrical jacket open at both ends and adapted to enclose said lamp;
(b) first electrically conducting, hollow connector means extending through one end of said jacket and electrically connected to the anode end of said lamp;
(c) second electrically conducting, hollow connector means extending through the opposite end of said jacket and electrically connected to the cathode end of said lamp;
(d) means for introducing a coolant from an inlet means into said first connector means and for discharging said coolant into said jacket adjacent said anode end of said lamp;
(e) means for discharging said coolant from said jacket into said second connector means adjacent said cathode end of said lamp and for discharging said coolant from said second connector into an outlet means;
(f) means for applying a voltage to said first connector means, and thereby to said anode end of said lamp;
(g) means for connecting said second connector means, and thereby said cathode end of said lamp, to ground potential;
(h) sealing means providing a seal for said coolant between said first and second connector means and said ends of said jacket, at least a portion of said sealing means being electrically conducting and extending outside of said jacket; and
(i) an electrically insulating element attached to the outside of said laser head and enclosing said anode end of said lamp and said sealing means, said insulating element formed of a plastic material and having means shielding said insulating element from at least a portion of the light rays emitted by said lamp and said shielding means comprises a double walled glass insulator, having an electrically conducting opaque bushing arranged between the walls of said glass insulator, and said laser head being at the cathode potential and said opaque bushing connected to said head.

References Cited

UNITED STATES PATENTS 2,497,396   7/1949   Weiskopt _____ 313—23 X

FOREIGN PATENTS 1,299,093   6/1962   France.

DAVID J. GALVIN, *Primary Examiner.*